(12) United States Patent
Lin et al.

(10) Patent No.: US 8,934,733 B2
(45) Date of Patent: Jan. 13, 2015

(54) METHOD, APPARATUS, AND NON-TRANSITORY COMPUTER READABLE MEDIUM FOR ENHANCING IMAGE CONTRAST

(71) Applicant: MStar Semiconductor, Inc., Hsinchu Hsien (TW)

(72) Inventors: Hsin-Chuan Lin, Hsinchu Hsien (TW); Hsin-Chun Chiang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 14/043,247

(22) Filed: Oct. 1, 2013

(65) Prior Publication Data

US 2014/0254924 A1    Sep. 11, 2014

(30) Foreign Application Priority Data

Mar. 6, 2013 (TW) .............................. 102107881 A

(51) Int. Cl.
   *G06K 9/40* (2006.01)
   *G06T 7/40* (2006.01)

(52) U.S. Cl.
   CPC ...................................... *G06T 7/408* (2013.01)
   USPC ........... 382/274; 382/254; 382/164; 382/171; 382/173

(58) Field of Classification Search
   USPC ......... 382/274, 254, 164, 167, 171, 173, 190, 382/168, 131; 345/20, 581; 235/454; 348/E9.026; 358/3.26, 3.27; 359/201.1; 355/71, 67; 430/60
   See application file for complete search history.

(56) References Cited

U.S. PATENT DOCUMENTS

| | | | | |
|---|---|---|---|---|
| 6,832,724 B2 * | 12/2004 | Yavid et al. | .................... | 235/454 |
| 7,386,185 B2 * | 6/2008 | Watanabe et al. | ............. | 382/274 |
| 8,265,390 B2 * | 9/2012 | Dube et al. | ..................... | 382/168 |
| 8,542,918 B2 * | 9/2013 | Bryant et al. | ................. | 382/167 |

* cited by examiner

*Primary Examiner* — Anh Do
(74) *Attorney, Agent, or Firm* — WPAT, PC; Justin King

(57) ABSTRACT

The present invention describes enhancing image contrast comprising the following steps: determining a segmentation point according to at least one segmentation threshold and pixel statistical data of a picture, wherein the segmentation point is utilized to divide the pixel statistical data into a first partial statistical data and a second partial statistical data; and determining a first partial brightness conversion function and a second partial brightness conversion function according to the first and the second partial statistical data, respectively. The first partial brightness conversion function is used to adjust brightness values of multiple pixels in the picture corresponding to the first partial statistical data, and the second partial brightness conversion function is used to adjust brightness values of multiple pixels in the picture corresponding to the second partial statistical data.

17 Claims, 8 Drawing Sheets

METHOD, APPARATUS, AND NON-TRANSITORY COMPUTER READABLE MEDIUM FOR ENHANCING IMAGE CONTRAST

CROSS REFERENCE TO RELATED APPLICATIONS

This application claims priority under 35 U.S.C 119 to Taiwan patent application, TW102107881, filed on Mar. 6, 2013, the disclosure of which is incorporated herein by reference.

BACKGROUND OF THE INVENTION

1. Field of the Invention

The present invention relates to image processing, and more particularly, to method, apparatus, and non-transitory computer readable medium for enhancing image contrast.

2. Description of the Prior Art

Image processing technologies are quite mature in the current art. Papers and documents provide many kinds of image processing algorithms for references. However, in practical implementation, traditional image processing methods have some deficiencies in picture processing.

According to related technologies, algorithms of picture processing utilized by traditional image processing methods are not applicable in some special scenarios. For these special scenarios, a picture processing result is not satisfactory if using traditional image processing methods. For example, a traditional histogram equalization method usually causes problems which may include contrast being too high or contrast is sacrificed in small areas if the image. This usually leads to loss of information with respect to some brightness grey levels in the picture which fail to meet typical requirements of desired quality. Therefore, a new method for enhancing image processing performance is needed.

SUMMARY OF THE INVENTION

One of objectives of the present invention is to provide a method, apparatus, and non-transitory computer readable medium with instructions for enhancing image contrast in order to solve the above stated problems in the art.

Another one of objectives of the present invention provides a method, apparatus, and non-transitory computer readable medium with instructions for enhancing image contrast in order to achieve the most appropriate contrast enhancement for a given image during processing.

A preferred embodiment of the present invention provides a method for enhancing image contrast, applicable to an image processing apparatus. The method comprises the following steps: determining a segmentation point according to at least one segmentation threshold and pixel statistical data of a picture, wherein the segmentation point is utilized to divide the pixel statistical data into a first partial statistical data and a second partial statistical data; and determining a first partial brightness conversion function and a second partial brightness conversion function according to the first and the second partial statistical data, respectively. The first partial brightness conversion function is used to adjust brightness values of multiple pixels in the picture corresponding to the first partial statistical data, and the second partial brightness conversion function is used to adjust brightness values of multiple pixels in the picture corresponding to the second partial statistical data.

Additionally, the present invention also provides a corresponding non-transitory computer readable medium, storing program instructions for execution by a processor. The processor executes the program instructions to perform a method for enhancing image contrast. The method comprises: determining a segmentation point according to at least one segmentation threshold and pixel statistical data of a picture, wherein the segmentation point is utilized to divide the pixel statistical data into a first partial statistical data and a second partial statistical data; and determining a first partial brightness conversion function and a second partial brightness conversion function according to the first and the second partial statistical data, respectively.

Additionally, the present invention also provides a corresponding apparatus for enhancing image contrast. The apparatus comprises a processor and a data processing circuit. The processor is configured for determining a segmentation point according to at least one segmentation threshold and pixel statistical data of a picture, wherein the segmentation point is utilized to divide the pixel statistical data into a first partial statistical data and a second partial statistical data, and determining a first partial brightness conversion function and a second partial brightness conversion function according to the first and the second partial statistical data, respectively. The data processing circuit is configured for performing brightness conversion operation according to the first and the second partial brightness conversion functions. The first partial brightness conversion function is used to adjust brightness values of multiple pixels in the picture corresponding to the first partial statistical data, and the second partial brightness conversion function is used to adjust brightness values of multiple pixels in the picture corresponding to the second partial statistical data.

One of the improvements of the present invention provides better image processing results in some special scenarios and prevents problems of traditional image processing methods which may include contrast being too high or contrast is sacrificed in small areas of the image in accordance with the method and apparatus provided by the present invention. Hence, the current method and apparatus, as well as computer and associated program module embodying the present invention, can reserve sufficient details corresponding to some brightness grey levels and satisfy user requirements for desired image quality. Comparing with related technologies, the present invention can largely improve performance of image processing. Moreover, comparing with related technologies, the disclosed method and apparatus, as well as computer and associated program module embodying the present invention, can enhance the contrast of an original picture and sacrifice little or no contrast in some small areas of original picture.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
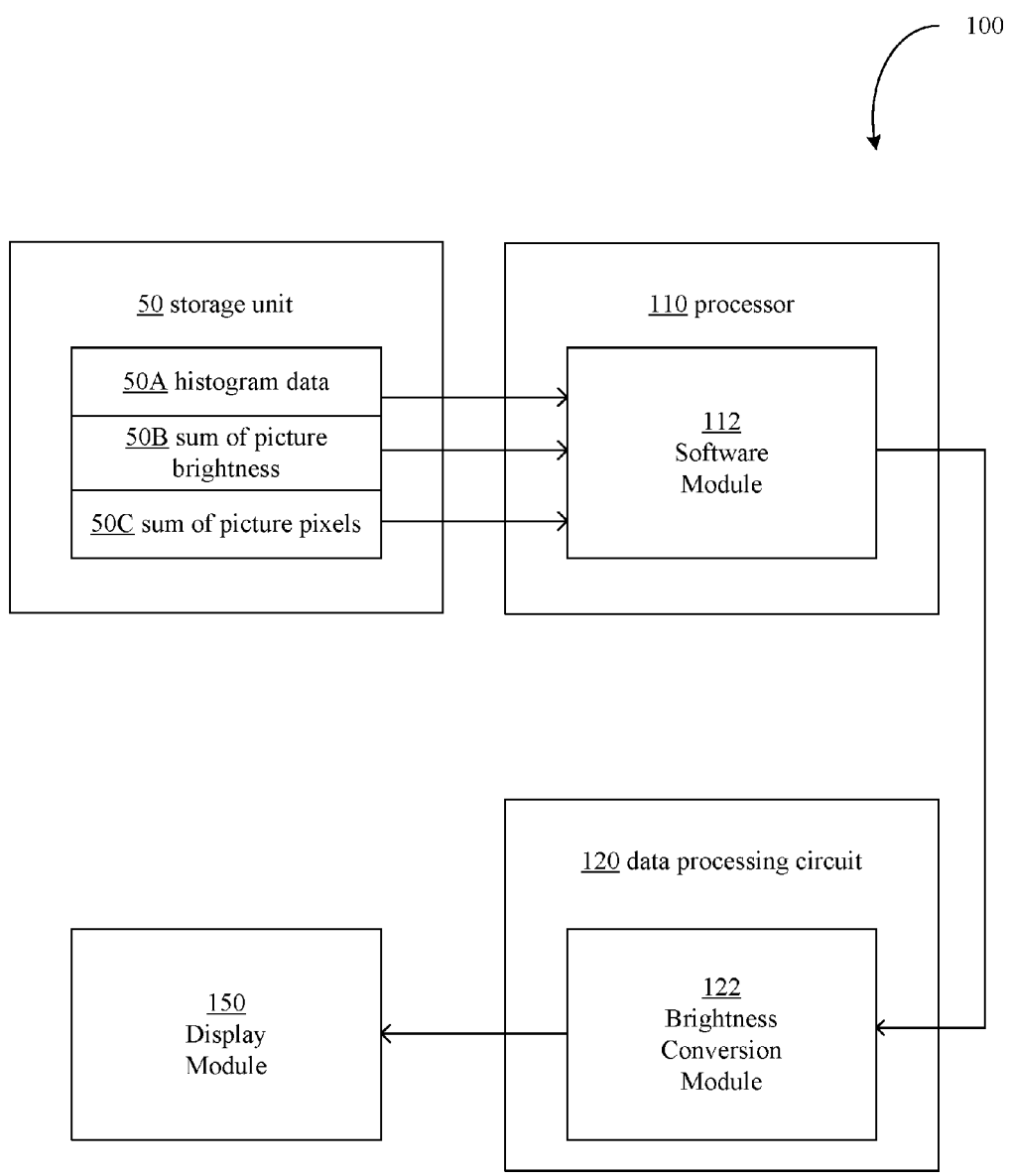
FIG. 1 is a block diagram of an apparatus for enhancing image contrast in accordance with an embodiment of the present invention.

Please refer to FIG. 1, which is a block diagram of an apparatus 100 for enhancing image contrast in accordance with an embodiment of the present invention. The apparatus 100 may comprise at least one part or all of an image processing device which may include but is not limited to television, display, set-top-box, mobile phone, camera, personal digital assistant, and notebook computer. For example, the apparatus 100 may represent an electronic part of the image processing device and the electronic part further comprises at least one control circuit of the image processing device. Alternatively, the apparatus 100 may represent the whole of the image processing device. The description is used to explain the present invention, but should not used to limit the present invention solely to the details of the provided description. According to the present embodiment, the apparatus 100 may represent an audio/video system including the image processing device.

As shown in FIG. 1, the apparatus 100 comprises a storage unit 50 (e.g., memory or register) which temporarily stores histogram data 50A (e.g., a histogram data of the current picture), sum of picture brightness 50B (e.g., sum of Y values (luminance) of every pixel represented in the form of color space (Y, Cb, Cr) in the current picture), and sum of picture pixels 50C (e.g., pixel number of the current picture). The apparatus 100 further comprises a processor 110 which may execute a software module 112 including multiple program instructions. The program instructions may be stored in non-transitory computer readable medium such as non-volatile memory and/or hard disk in advanced systems. The apparatus 100 comprises a data processing circuit 120 coupled to the processor 110. The data processing circuit 120 further comprises a brightness conversion module 122 which is arranged to convert brightness data of the picture to generate picture processing result. At last, the apparatus 100 comprises a display module 150 for receiving the picture processing results and display image corresponding to the picture processing results. In particular, the processor 110 is configured to execute the program instructions for operation of enhancing image contrast.

Figure 2:
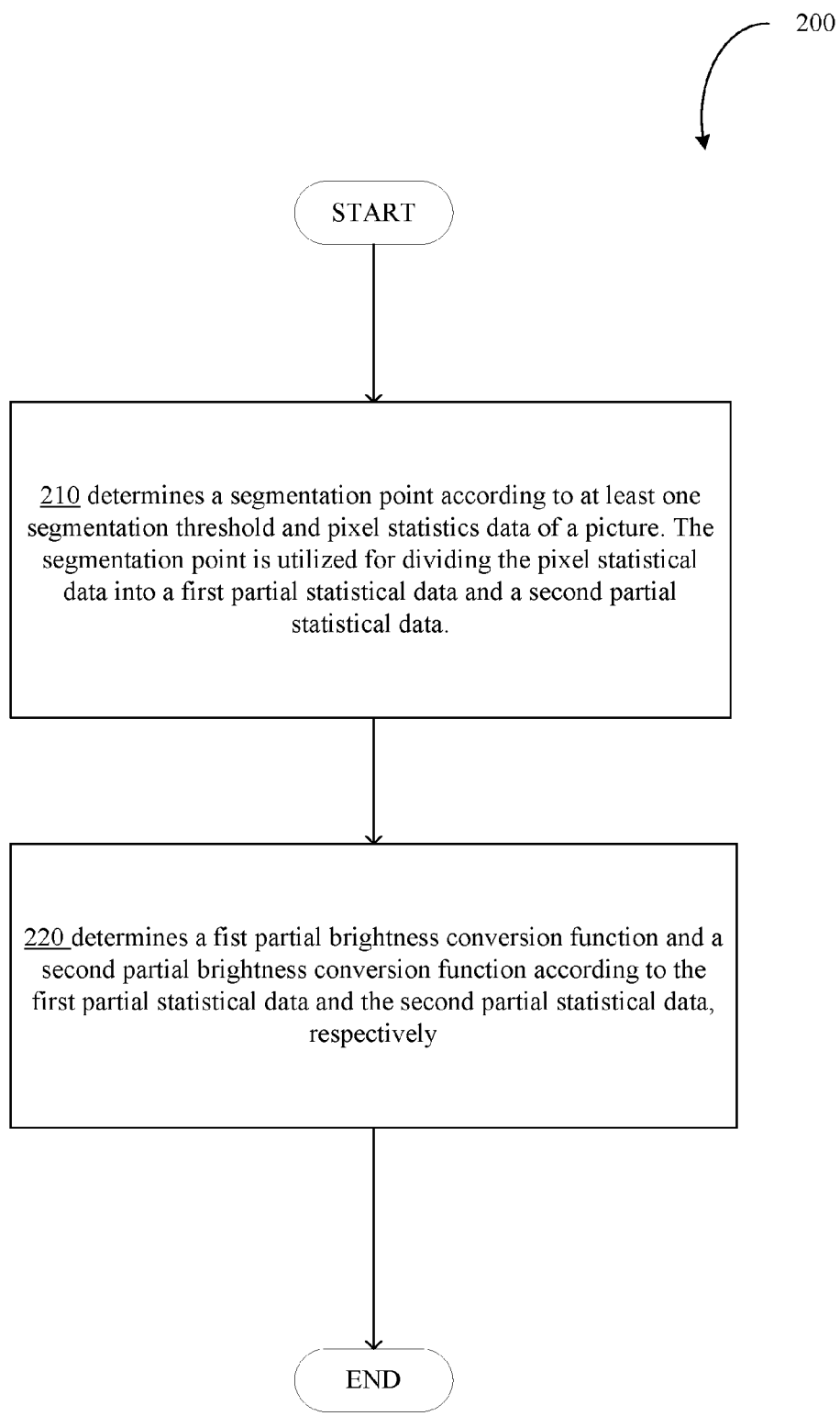
FIG. 2 is a flowchart diagram depicts a method for enhancing image contrast in accordance with an embodiment of the present invention.

Please refer to FIG. 2, which is a flowchart diagram depicts a method 200 for enhancing image contrast in accordance with an embodiment of the present invention. The method 200 is applicable on the apparatus 100 shown in FIG. 1, in particular, on the processor 110 shown in FIG. 1. The processor 110 may execute the program instructions corresponding to the method 200. The method 200 is described below.

At step 210, the processor 110 determines a segmentation point according to at least one segmentation threshold and pixel statistics data of a picture. The segmentation point is utilized for dividing the pixel statistical data into a first partial statistical data and a second partial statistical data.

At step 220, the processor 110 determines a first partial brightness conversion function and a second partial brightness conversion function according to the first partial statistical data and the second partial statistical data, respectively.

According to the present embodiment, the data processing circuit 120 performs brightness conversions according to the first partial brightness function and the second partial brightness function. The first partial brightness conversion function is utilized for adjusting the brightness values of the pixels corresponding to the first partial statistical data within the picture. The second partial brightness conversion function is utilized for adjusting the brightness values of the pixels corresponding to the second partial statistical data within the picture. More specifically, the pixel statistical data is statistical data of each particular pixel in the form of numbers corresponding to grey level values. Besides, at step 210, the at least one segmentation threshold comprises a high segmentation threshold and a low segmentation threshold, and the segmentation point is calculated by the following formula:

$$SepPoint = SepTH\_H - (SepTH\_H - SepTH\_L) * Yave/(GLT-1)$$

where SepPoint represents the segmentation point, SepTH_H and SepTH_L represents the high segmentation threshold and the low segmentation threshold, respectively, and Yave and GLT denote the luma average and total grey level number, respectively.

According to one example of this embodiment, the step 220 further comprises generating the partial brightness conversion functions based on calculations of those partial statistical data according to a change rate limitation. According to another example of this embodiment, a brightness conversion function of this picture is comprising of the first and the second partial brightness conversion functions. The method 200 may further comprise a detecting scenario for generating a scenario detecting result which indicates whether a scenario change has happened between the picture and the previous picture. The method 200 may further comprise generating a blended brightness conversion function for adjusting brightness of the picture by blending the brightness conversion function corresponding to the picture and another brightness conversion function corresponding to a previous picture according to a blending ratio of the scenario detecting result. Moreover, if the scenario detecting result indicates a scenario change between the picture and the previous picture, the blending ratio of the brightness conversion function is higher than the blending ratio of another brightness conversion function. Otherwise, if the scenario detecting result indicates no scenario change between the picture and the previous picture, the blending ratio of the brightness conversion function is lower than the blending ratio of another brightness conversion function. The description is used to explain the present invention, but not used to limit the present invention. According to one alternative example of this embodiment, the step of detecting scenario for generating the scenario detecting result may further comprise calculating a differential value between pixel statistical data of the picture and pixel statistical data of the previous picture; and comparing the differential value with a predetermined threshold value for determining the scenario detecting result. According to another alternative example of this embodiment, the step of detecting scenario for generating the scenario detecting result may further comprises calculating a differential value between the brightness conversion function corresponding to the picture and the brightness conversion corresponding to the previous picture; and comparing the differential value with a predetermined threshold value for determining the scenario detecting result.

In some examples of this embodiment, a brightness conversion function of the picture is formed by the first and second partial brightness conversion functions. Alternatively, the method may further comprise providing a plurality of brightness conversion curves; determining whether pixel statistical data falls into one specified interval of a plurality of intervals; if pixel statistical data falls into the specified interval, selecting one brightness conversion curve corresponding to the specified interval from the plurality of brightness conversion curves and blending the brightness conversion function and the brightness conversion curve to generate a blended brightness conversion function for adjusting brightness of the picture.

Figure 3:
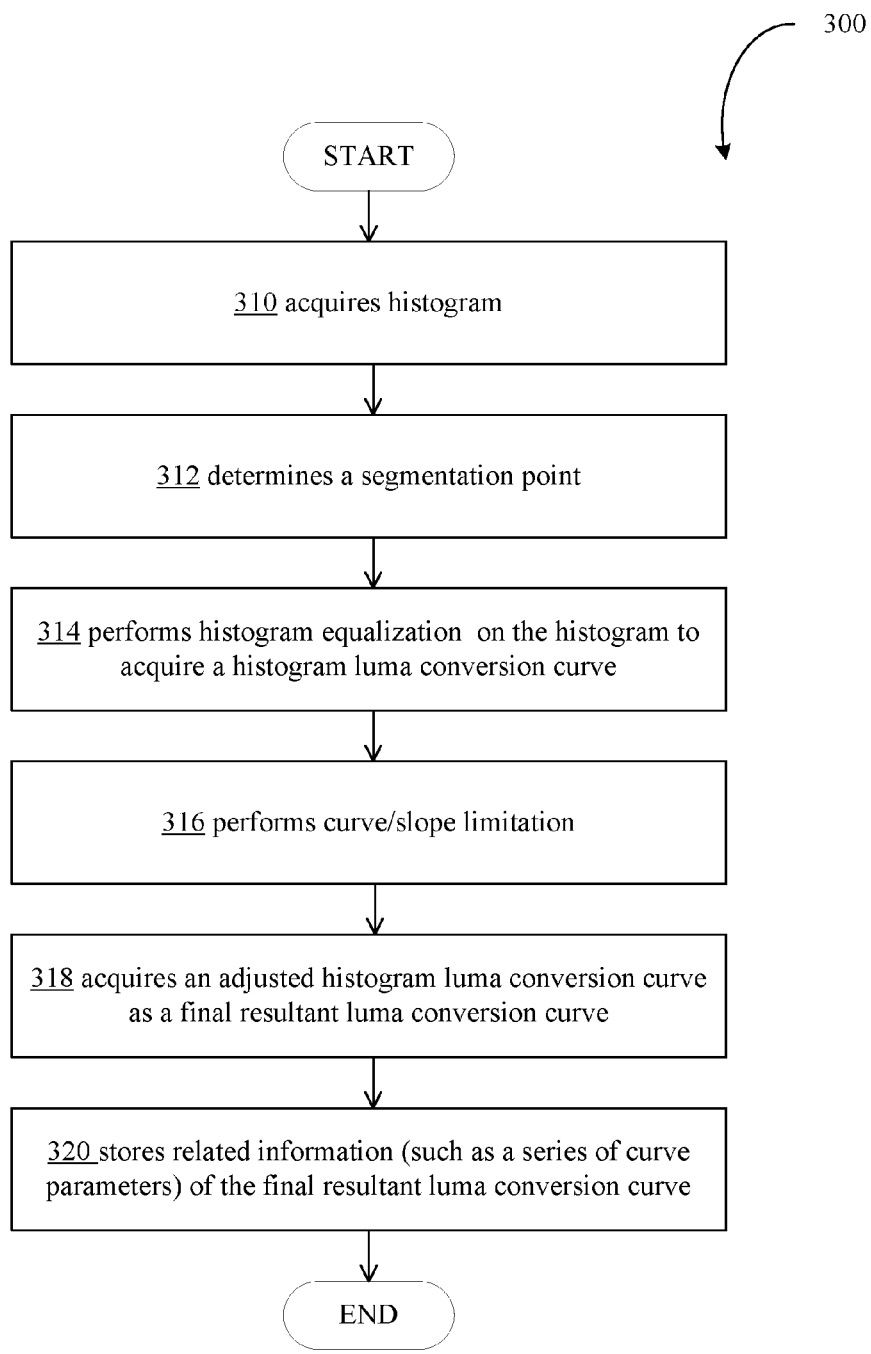
FIG. 3 is a flowchart of one embodiment of the method shown in FIG. 2.

Please refer to FIG. 3, which is a flowchart 300 of one embodiment of the method 200 shown in FIG. 2.

At step 310, the processor 110 acquires a histogram of a current picture.

At step 312, the processor 110 determines a segmentation point for the histogram.

At step 314, the processor 110 performs histogram equalization on the histogram to acquire a histogram luma conversion curve.

At step 316, the processor 110 performs a curve/slope limitation on the histogram luma conversion curve.

At step 318, the processor 110 acquires an adjusted histogram luma conversion curve as a final resultant luma conversion curve.

At step 320, the processor 110 stores related information (such as a series of curve parameters) of the final resultant luma conversion curve for brightness conversion performed by the data processing circuit 120.

Figure 4:
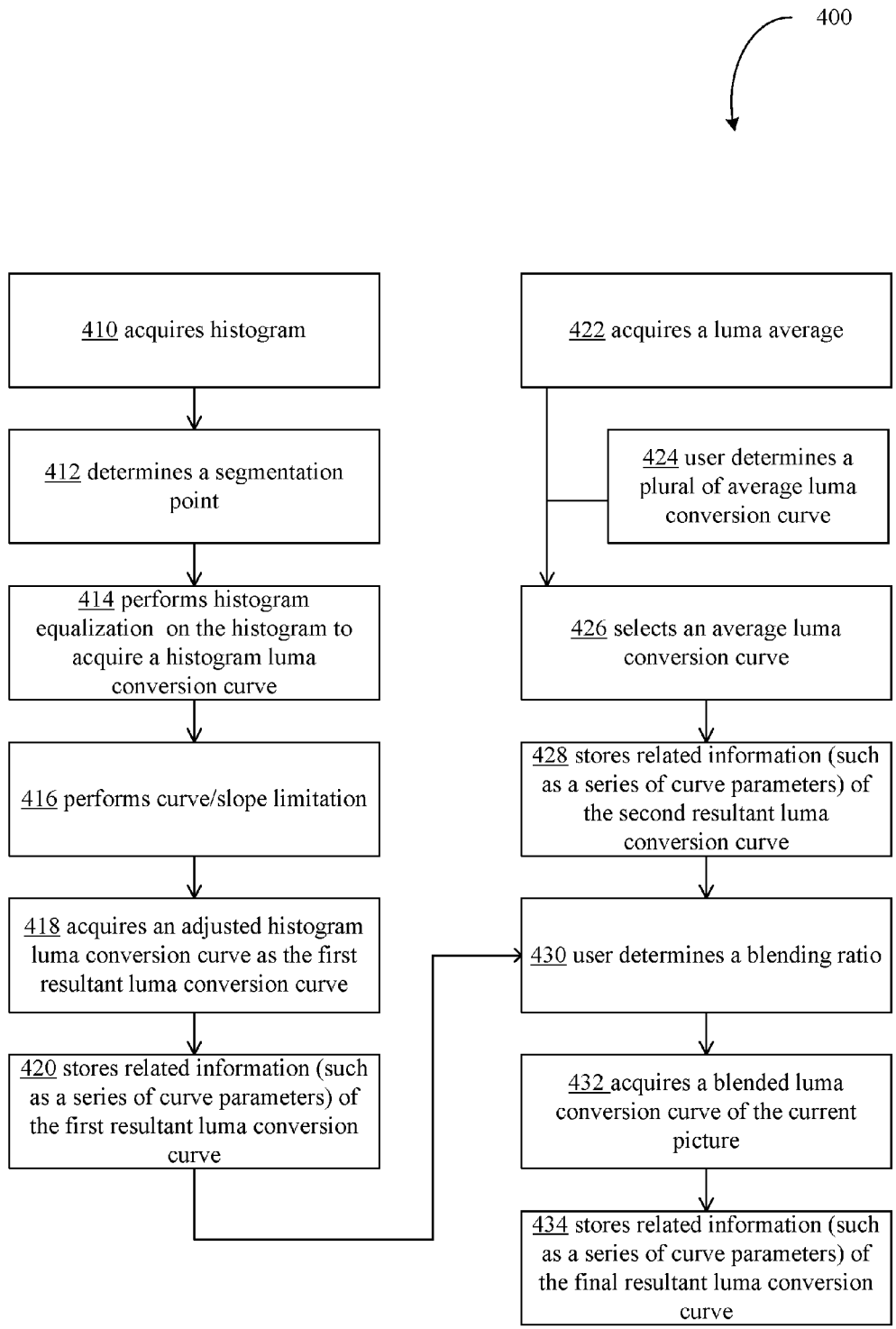
FIG. 4 is a flowchart of another embodiment of the method shown in FIG. 2.

Please refer to FIG. 4, which is another flowchart 400 of one embodiment of the method 200 shown in FIG. 2.

At step 410, the processor 110 acquires a histogram of a current picture.

At step 412, the processor 110 determines a segmentation point for the histogram.

At step 414, the processor 110 performs histogram equalization on the histogram to acquire a histogram luma conversion curve.

At step 416, the processor 110 performs a curve/slope limitation on the histogram luma conversion curve.

At step 418, the processor 110 acquires an adjusted histogram luma conversion curve as the first resultant luma conversion curve.

At step 420, the processor 110 stores related information (such as a series of curve parameters) of the first resultant luma conversion curve for further usage.

At step 422, the processor 110 acquires a luma average.

At step 424, the processor 110 allows the user to determine a plural of average luma conversion curve that corresponding to different luma average.

At step 426, the processor 110 selects an average luma conversion curve as a second resultant luma conversion curve according to the luma average.

At step 428, the processor 110 stores related information (such as a series of curve parameters) of the second resultant luma conversion curve for further usage.

At step 430, the processor 110 allows the user to determine a blending ratio, especially for the first resultant luma conversion curve at step 420 and the second resultant luma conversion curve at step 428.

At step 432, the processor 110 acquires a blended luma conversion curve of the current picture as the final resultant luma conversion curve.

At step 434, the processor 110 stores related information (such as a series of curve parameters) of the final resultant luma conversion curve for brightness conversion by the data processing circuit 120.

Figure 5:
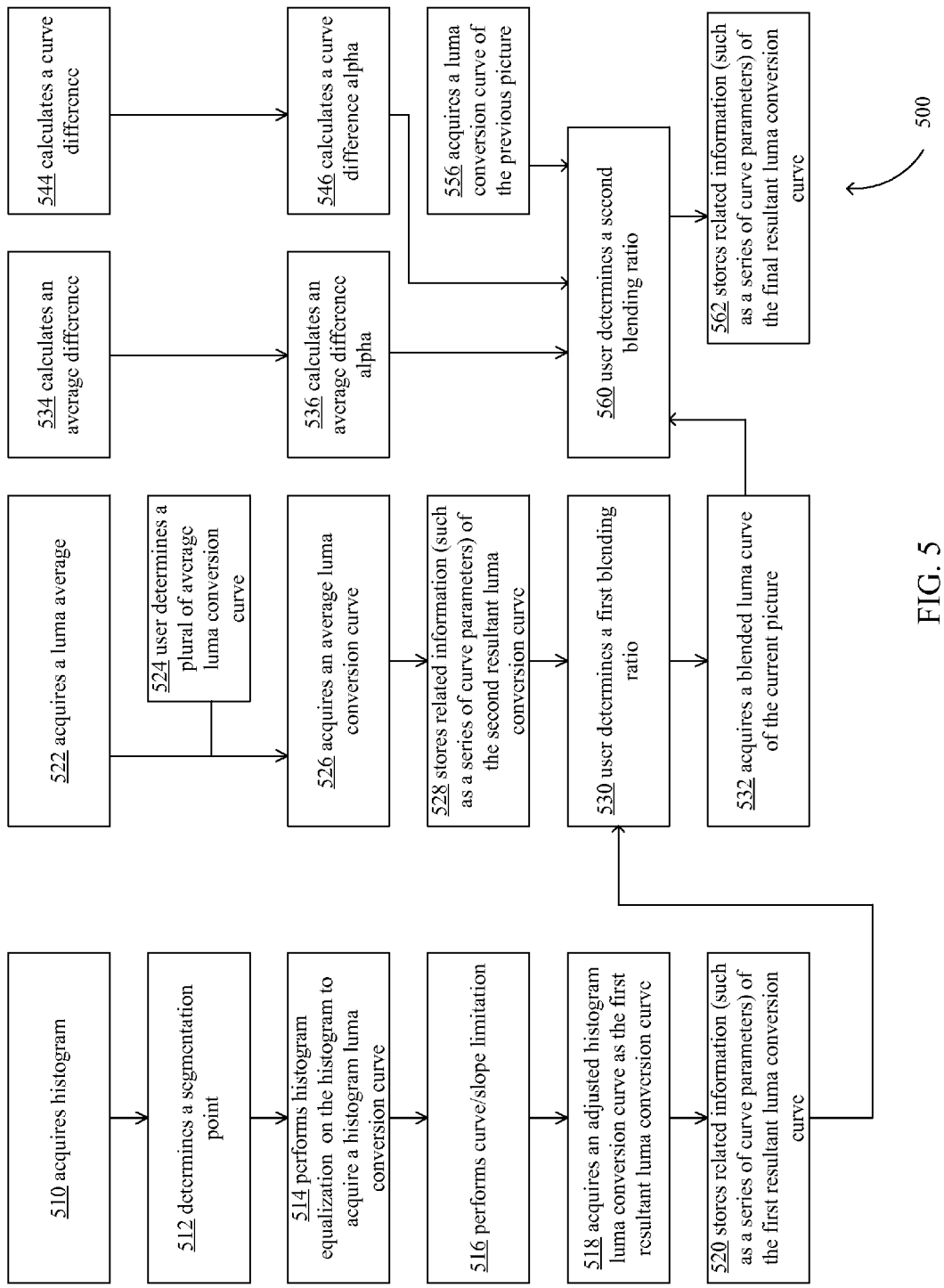
FIG. 5 is a flowchart of another embodiment of the method shown in FIG. 2.

Please refer to FIG. 5, which is an alternative flowchart 500 of one embodiment of the method 200 shown in FIG. 2.

At step 510, the processor 110 acquires a histogram of a current picture.

At step 512, the processor 110 determines a segmentation point of the histogram.

At step 514, the processor 110 performs histogram equalization on the histogram to acquire a histogram luma conversion curve.

At step 516, the processor 110 performs curve/slope limitation on the histogram luma conversion curve.

At step 518, the processor 110 acquires an adjusted histogram luma conversion curve as the first resultant luma conversion curve.

At step 520, the processor 110 stores related information (such as a series of curve parameters) of the first resultant luma conversion curve for further usage.

At step 522, the processor 110 acquires a luma average.

At step 524, the processor 110 allows user to determine a plural of average luma conversion curve that corresponding to different luma average.

At step 526, the processor 110 selects an average luma conversion curve as a second resultant luma conversion curve according to the luma average.

At step 528, the processor 110 stores related information (such as a series of curve parameters) of the second resultant luma conversion curve for further usage.

At step 530, the processor 110 allows the user to determine a first blending ratio, especially for the first resultant luma conversion curve at step 520 and the second resultant luma conversion curve at step 528.

At step 532, the processor 110 acquires a blended luma conversion curve of the current picture.

At step 534, the processor 110 calculates an average difference.

At step 536, the processor 110 calculates an average difference blending parameter (average difference alpha).

At step 544, the processor 110 calculates a curve difference.

At step 546, the processor 110 calculates a curve difference blending parameter (curve difference alpha).

At step 556, the processor 110 acquires a luma conversion curve of the previous picture.

At step 560, the processor 110 allows user to determine a second blending ratio, especially for the blended luma conversion curve of the current picture at step 532 and the luma conversion curve of the previous picture at step 556, and acquires the final resultant luma conversion curve.

At step 562, the processor 110 stores related information (such as a series of curve parameters) of the final resultant luma conversion curve for brightness conversion by the data processing circuit 120.

Figure 6:
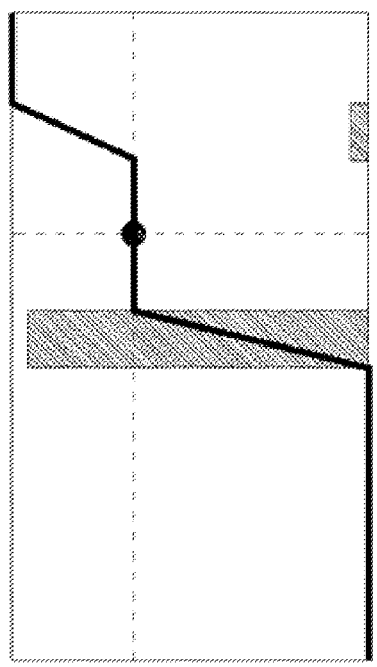
FIG. 6 depicts a segmentation point involved in an embodiment of the method shown in FIG. 2.
Figure 6:
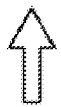
Figure 6:
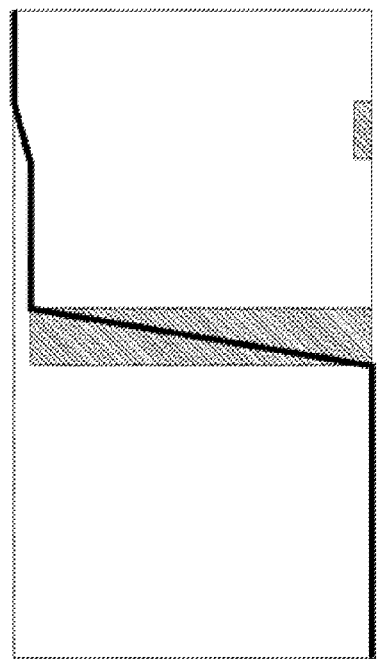

Please refer to FIG. 6, which depicts a segmentation point involved in an embodiment of the method 200 shown in FIG. 2. The left part of FIG. 6 represents a luma curve and histogram without utilizing histogram segmentation point; and the right part of FIG. 6 represents a luma curve and histogram utilizing histogram segmentation point. Please be aware that with respect to the shown histogram, the horizontal axis represents brightness and the vertical axis represents pixel number. Most of pixels are concentrated in about the middle of the horizontal axis. The luma average of these pixels dominates the luma average of this present picture. A small portion of pixels in the histogram are concentrated in a region on the right side of the figure on the horizontal axis as shown in FIG. 6. Due to the location of where the histogram segmentation point is adopted, grey level details of this small portion of pixels are preserved during the image enhancement processing.

Figure 7:
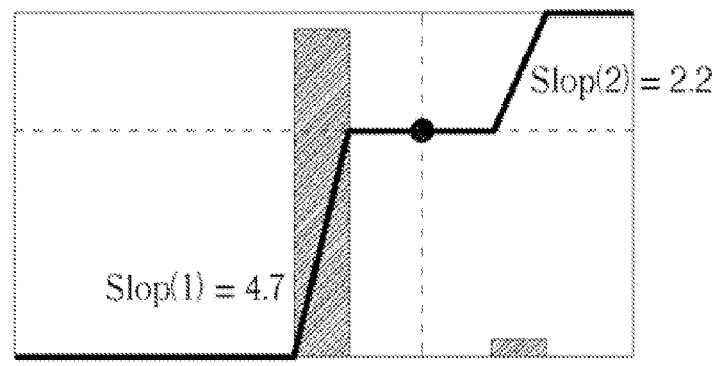
FIG. 7 illustrates slope parameters involved in an embodiment of the method shown in FIG. 2.
Figure 8:
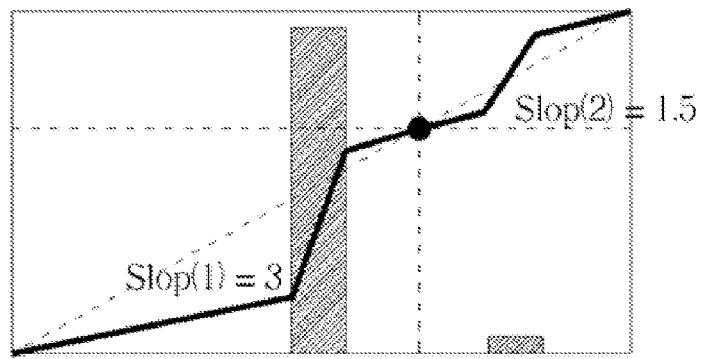
FIG. 8 illustrates slope parameter adjustment shown in FIG. 7 involved in the same embodiment of the method shown in FIG. 2.

Please refer to FIG. 7 which illustrates slope parameters Slop(1) and Slop(2) involved in an embodiment of the method 200 shown in FIG. 2. Please also refer to FIG. 8 which illustrates slope parameter adjustment involved in the same embodiment of the method 200 shown in FIG. 2. Any of the flows 300, 400, and 500 may adjust the slope parameters Slop(1) and Slop(2) of luma curve. For example, considering the present histogram of the embodiment shown in FIG. 6, slopes of the left and right raising edge of the luma curve utilizing histogram segmentation point are 4.7 and 2.2, respectively. Assuming the ceilings of the parameters Slop(1) and Slop(2) are predetermined as 3 and 1.5, respectively, the processor 110 adjusts the luma curve shown in FIG. 7 to the luma curve shown in FIG. 8 such that Slop(1) is set as 3 and Slop(2) is set as 1.5 when the processor 110 performs curve/slope limitation steps.

Figure 9:
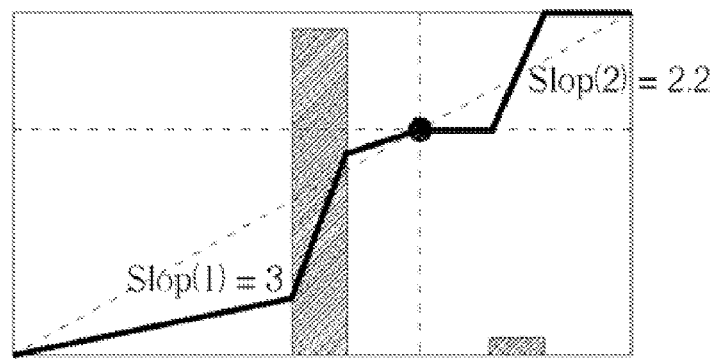
FIG. 9 illustrates slope parameter adjustment involved in an embodiment of the method shown in FIG. 2.

Please refer to FIG. 9, which illustrates slope parameter adjustment involved in an embodiment of the method 200 shown in FIG. 2. Any of the flows 300, 400, and 500 may adjust the slope parameters Slop(1) and Slop(2) of luma curve. For example, considering the present histogram of the embodiment shown in FIG. 6, slops of the left and right raising edge of the luma curve utilizing histogram segmentation point are 4.7 and 2.2, respectively. Assuming the ceilings of the parameters Slop(1) and Slop(2) are predetermined as 3 and 3, respectively, the processor 110 adjusts the luma curve shown in FIG. 7 to the luma curve shown in FIG. 9 such that Slop(1) is set as 3 and Slop(2) is set as 2.2 when the processor 110 performs curve/slope limitation steps. The luma curve corresponding to the second slope parameter Slop(2) is not adjusted.

Figure 10:
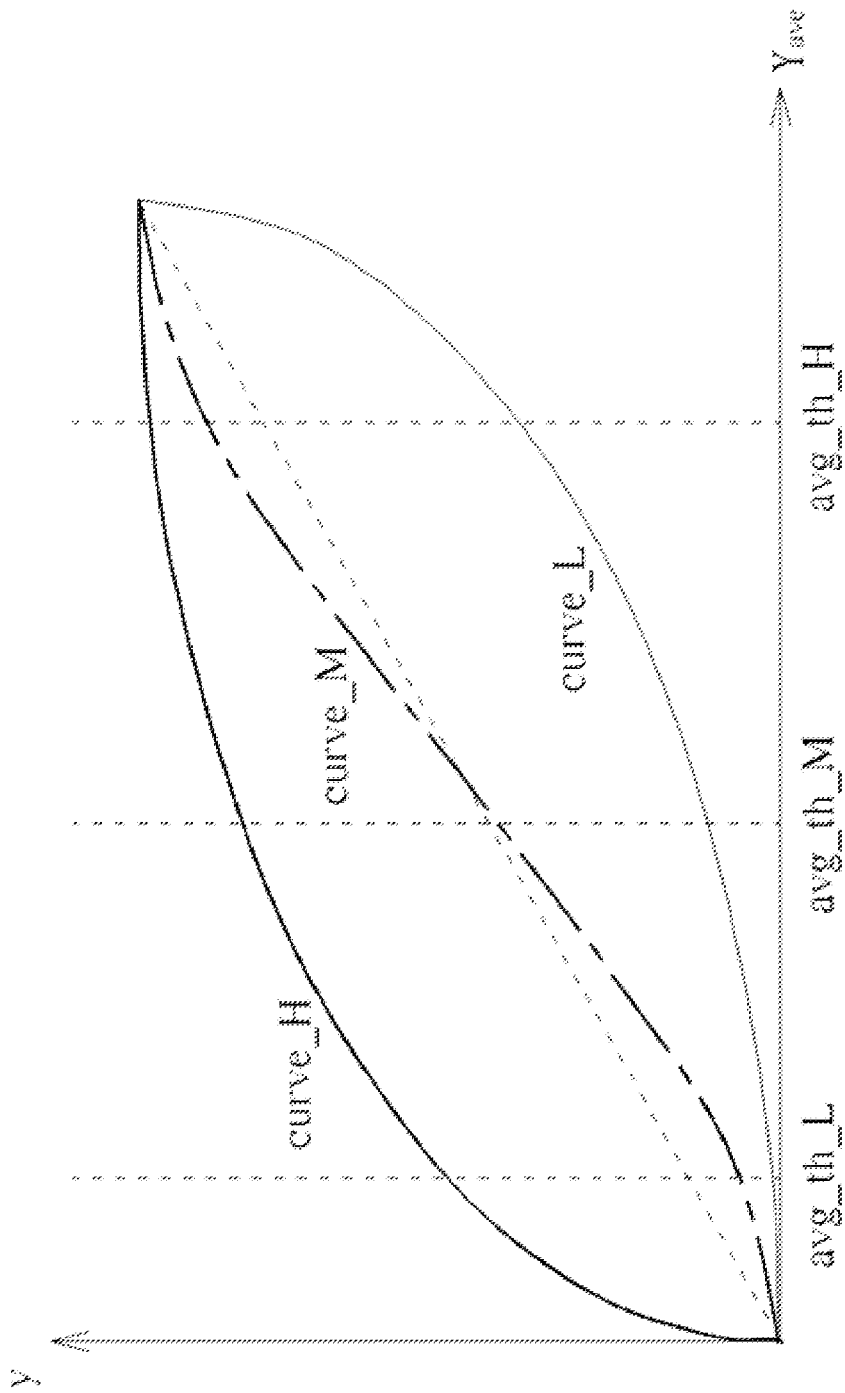
FIG. 10 depicts brightness conversion curve involved in an embodiment of the method shown in FIG. 2

Please refer to FIG. 10, which depicts brightness conversion curve involved in an embodiment of the method shown in FIG. 2. The symbols avg_th_H, avg_th_M, and avg_th_L represent threshold values and the symbols curve_H, curve_M, and curve_L represent brightness conversion curves or curve parameters of corresponding brightness conversion curves.

According to the present invention, the processor 110 may generate a resultant luma conversion curve by blending the brightness conversion curves curve_H, curve_M, and curve_L, for example, blending in linear combination. For example, the processor 110 may perform the blending according to an algorithm represented by the following pseudo codes.

```
{
   If Yave ≤ avg_th_L
      y = curve_H;
   If avg_th_L < Yave ≤ avg_th_M
      alpha = (Yave− ave_th_L) / (ave_th_M − ave_th_L);
      y = (1−alpha) * curve_H + alpha * curve_M;
   If avg_th_M < Yave ≤ avg_th_H
      alpha = (Yave− avg_th_M) / (avg_th_M − avg_th_M);
      Y = (1−alpha) * curve_M + alpha * curve_L;
   If Yave > arg_th_H
      y = curve_L;
}
``` where the symbols Yave, y, and alpha represent luma average, adjusted brightness, and blending parameter (or blending ratio), respectively.

According to some examples of this embodiment, the following describes how to determine scenario changes in such kind of contrast enhancing algorithm. In case previous picture and current picture are continuous, the processor 110 needs to limit the changes of conversion functions of these two pictures in order to prevent flickering. A gradual transition effect is usually achieved by utilizing IIR (infinite impulse response) filter. In the other hand, in case previous picture and current picture are mutually irrelevant, the processor 110 needs to switch conversion function immediately in order to prevent gradual transition. For example, the processor 110 may perform the following algorithm:

Output_Curve=alpha*Current_Curve+(1−alpha)*Previous_Curve;

where the symbols Output_Curve, Previous_Curve, and Current_Curve represent output curve (or blended resultant luma curve), resultant luma curve corresponding to previous picture, and resultant luma curve corresponding to current picture, respectively.

Concluded from the algorithm above, if the alpha value approaches to zero, the output curve is approached to the resultant luma curve corresponding to previous picture. This case is suitable for continuous pictures. If the alpha value approaches to one, the output curve is approached to the resultant luma curve corresponding to current picture. It is suitable for mutually irrelevant pictures (i.e., scenario change)

Furthermore, the following describes how to control the alpha value or blending ratio of scenario change. Two methods are provided by the present invention, an average difference method and a conversion function difference method. For example, according to the average difference method, if the luma average value of previous picture is about the luma average value of current picture, the processor 110 determines these pictures are continuous. If the luma average value of previous picture is largely different to the luma average value of current picture (e.g., in case the difference is larger than a threshold), the processor 110 determines that these pictures are in different scenarios. Moreover, for example, according to conversion function difference method, if the brightness conversion function of previous picture is about the brightness conversion function of current picture, the processor 110 determines these pictures are continuous. If the brightness conversion function of previous picture is largely different to the brightness conversion function of current picture, the processor 110 determines that these pictures are in different scenarios.

Besides, the processor 110 may acquire a blending parameter of average difference method, alpha_ave, according to the average difference method and acquire a blending parameter of conversion function difference method, alpha_his, according to the conversion function difference method. In various implementations, the processor 110 may generate a final scenario change alpha value (or blending parameter) by comparing the blending parameter of average difference method, alpha_ave, with the blending parameter of conversion function difference method, alpha_his. For example, the processor 110 may allow user to select one of the larger or the smaller of alpha_ave and alpha_his or a linearly combined blending parameter of alpha_ave and alpha_his.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A method for enhancing image contrast, applicable to an image processing apparatus, comprising:
   determining a segmentation point according to at least one segmentation threshold and pixel statistical data of a current picture, wherein the pixel statistical data is divided into a first partial statistical data and a second partial statistical data based on the segmentation point; and
   determining a first partial brightness conversion function and a second partial brightness conversion function according to the first and the second partial statistical data, respectively;
   wherein the first partial brightness conversion function is used to adjust brightness values of multiple pixels in the current picture corresponding to the first partial statistical data, and the second partial brightness conversion function is used to adjust brightness values of multiple pixels in the current picture corresponding to the second partial statistical data.

2. The method of claim 1, wherein the pixel statistical data is statistical data of pixel numbers corresponding to grey level numbers, and in the step of determining the segmentation point, the at least one segmentation threshold comprises a high segmentation threshold and a low segmentation threshold, the segmentation point is calculated according to the following formula:

$$SepPoint = SepTH\_H - (SepTH\_H - SepTH\_L) * Yave/(GLT-1)$$

where SepPoint represents the segmentation point, SepTH_H and SepTH_L represents the high segmentation threshold and the low segmentation threshold, respectively, and Yave and GLT denote the luma average and total grey level number, respectively.

3. The method of claim 1, wherein the step of determining the first partial brightness conversion function and the second partial brightness conversion function further comprises:
   generating the first partial brightness conversion function and the second partial brightness conversion function based on calculations of the first partial statistical data and the second partial statistical data according to a change rate limitation.

4. The method of claim 1, wherein a combined brightness conversion function is comprising of the first partial brightness conversion function and the second brightness conversion function, the method further comprising:
   detecting scenario for generating a scenario detecting result, wherein the scenario detecting result indicates whether a scenario change has happened between the current picture and a previous picture; and
   generating a blended brightness conversion function for adjusting brightness of the current picture by blending a first combined brightness conversion function corresponding to the current picture and a second combined brightness conversion function corresponding to the previous picture according to a blending ratio of the scenario detecting result.

5. The method of claim 4, wherein in case the scenario detecting result indicates a scenario change has happened between the picture and the previous picture, a blending ratio of the brightness conversion function is higher than a blending ratio of the another brightness conversion function in the blended brightness conversion function, and in the case where the scenario detecting result indicates no scenario change has happened between the picture and the previous picture, the blending ratio of the brightness conversion function is lower than the blending ratio of the another brightness conversion function in the blended brightness conversion function.

6. The method of claim 4, wherein the step of detecting scenario for generating the scenario detecting result further comprises:
   calculating a difference value between the pixel statistical data corresponding to the current picture and the pixel statistical data corresponding to the previous picture; and
   determining the scenario detecting result by comparing the difference value with a predetermined threshold.

7. The method of claim 4, wherein the step of detecting scenario for generating the scenario detecting result further comprises:
   calculating a difference value between the first brightness conversion function corresponding to the current picture and the second brightness conversion function corresponding to the previous picture; and
   comparing the difference value with a predetermined threshold for determining the scenario detecting result.

8. The method of claim 1, wherein a brightness conversion function is comprising of the first and the second brightness conversion functions, the method further comprising:
   providing a plurality of brightness conversion curves;
   determining whether the pixel statistical data falls into one specified interval of a plurality of intervals; and
   selecting one of the plurality of brightness conversion curves corresponding to the specified interval from the plurality of brightness conversion curves if the pixel statistical data falls into the specified interval and blending the brightness conversion function and the brightness conversion curve to generate a blended brightness conversion function for adjusting brightness of the picture.

9. A non-transitory computer readable medium, storing program instructions for execution by a processor, the processor executes the program instructions to perform a method for enhancing image contrast, the method comprising:
   determining a segmentation point according to at least one segmentation threshold and pixel statistical data of a picture, wherein the pixel statistical data is divided into a first partial statistical data and a second partial statistical data by the segmentation point; and
   determining a first partial brightness conversion function and a second partial brightness conversion function according to the first and the second partial statistical data, respectively.

10. An apparatus for enhancing image contrast, comprising:
    a processor, configured for determining a segmentation point according to at least one segmentation threshold and pixel statistical data of a current picture, wherein the pixel statistical data is divided into a first partial statistical data and a second partial statistical data by the segmentation point, and determining a first partial brightness conversion function and a second partial brightness conversion function according to the first partial statistical data and the second partial statistical data, respectively; and
    a data processing circuit, configured for performing brightness conversion operation according to the first partial brightness conversion function and the second partial brightness conversion function;

wherein the first partial brightness conversion function is used to adjust brightness values of multiple pixels in the current picture corresponding to the first partial statistical data, and the second partial brightness conversion function is used to adjust brightness values of multiple pixels in the current picture corresponding to the second partial statistical data.

11. The apparatus of claim 10, wherein the pixel statistical data is statistical data of pixel numbers corresponding to grey level numbers, and the at least one segmentation threshold comprises a high segmentation threshold and a low segmentation threshold, the segmentation point is calculated according to the following formula:

$$SepPoint = SepTH\_H - (SepTH\_H - SepTH\_L) * Yave / (GLT-1)$$

where SepPoint represents the segmentation point, SepTH_H and SepTH_L represents the high segmentation threshold and the low segmentation threshold, respectively, and Yave and GLT denote the luma average and total grey level number, respectively.

12. The apparatus of claim 10, wherein when the processor determining the first partial brightness conversion function and the second partial brightness conversion function, the processor is further configured for generating the first partial brightness conversion function and the second partial brightness conversion function based on calculations of the partial statistical data according to a change rate limitation.

13. The apparatus of claim 10, wherein a combined brightness conversion function is comprising of the first partial brightness conversion function and the second brightness conversion function, the processor is further configured for detecting scenario for generating a scenario detecting result, wherein the scenario detecting result indicates whether a scenario change has happened between the current picture and a previous picture; and
generating a blended brightness conversion function for adjusting brightness of the current picture by blending a first brightness conversion function corresponding to the current picture and a second brightness conversion function corresponding to the previous picture according to a blending ratio of the scenario detecting result.

14. The apparatus of claim 13, wherein in the case where the scenario detecting result indicates a scenario change has happened between the current picture and the previous picture, a blending ratio of the first brightness conversion function is higher than a blending ratio of the second brightness conversion function in the blended brightness conversion function, in the case where the scenario detecting result indicates no scenario change has happened between the picture and the previous picture, the blending ratio of the first brightness conversion function is lower than the blending ratio of the second brightness conversion function in the blended brightness conversion function.

15. The apparatus of claim 13, wherein when the processor detecting scenario for generating the scenario detecting result, the processor is further configured for calculating a difference value between pixel statistical data corresponding to the current picture and pixel statistical data corresponding to the previous picture; and comparing the difference value with a predetermined threshold for determining the scenario detecting result.

16. The apparatus of claim 13, wherein when the processor detecting scenario for generating the scenario detecting result, the processor is further configured for calculating a difference value between the first brightness conversion function corresponding to the current picture and the second brightness conversion function corresponding to the previous picture; and comparing the difference value with a predetermined threshold for determining the scenario detecting result.

17. The apparatus of claim 15, wherein the processor is further configured for performing the following steps:
providing a plurality of brightness conversion curves;
determining whether the pixel statistical data falls into one specified interval of a plurality of intervals; and
selecting one of the plurality of brightness conversion curves corresponding to the specified interval from the plurality of brightness conversion curves if the pixel statistical data falls into the specified interval and blending the first brightness conversion function and the brightness conversion curve to generate a blended brightness conversion function for adjusting brightness of the current picture.

* * * * *